United States Patent
Turtinen et al.

(10) Patent No.: US 10,966,179 B2
(45) Date of Patent: Mar. 30, 2021

(54) RAN AREA ID CONFIGURATION

(71) Applicant: NOKIA TECHNOLOGIES OY, Espoo (FI)

(72) Inventors: Samuli Turtinen, Ii (FI); Jarkko Koskela, Oulu (FI); Philippe Godin, Versailles (FR)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/621,624

(22) PCT Filed: Jun. 16, 2017

(86) PCT No.: PCT/FI2017/050453
§ 371 (c)(1),
(2) Date: Dec. 11, 2019

(87) PCT Pub. No.: WO2018/229323
PCT Pub. Date: Dec. 20, 2018

(65) Prior Publication Data
US 2020/0178206 A1    Jun. 4, 2020

(51) Int. Cl.
*H04W 68/02* (2009.01)
*H04W 76/28* (2018.01)
*H04W 4/029* (2018.01)
*H04W 76/27* (2018.01)
*H04W 48/20* (2009.01)
*H04W 60/02* (2009.01)
(Continued)

(52) U.S. Cl.
CPC .......... *H04W 68/02* (2013.01); *H04W 4/029* (2018.02); *H04W 48/20* (2013.01); *H04W 60/02* (2013.01); *H04W 64/003* (2013.01); *H04W 68/06* (2013.01); *H04W 76/27* (2018.02); *H04W 76/28* (2018.02)

(58) Field of Classification Search
CPC ............................. H04W 68/02; H04W 16/14
See application file for complete search history.

(56) References Cited

U.S. PATENT DOCUMENTS

2008/0220782 A1   9/2008  Wang et al.
2010/0075698 A1*  3/2010  Rune ................ H04W 68/08
                                                     455/458
(Continued)

FOREIGN PATENT DOCUMENTS

KR    20070065971 A    6/2007

OTHER PUBLICATIONS

International Search Report and Written Opinion for International Application No. PCT/FI2017/050453, dated Oct. 10, 2017, 17 pages.
(Continued)

*Primary Examiner* — Myron Wyche
(74) *Attorney, Agent, or Firm* — Brake Hughes Bellermann LLP

(57) ABSTRACT

A method comprising configuring a user equipment in a low activity state to operate within a radio access network wherein a radio access network notification area for the user equipment is defined based on a list of logically associated radio access network paging areas, wherein each of the logically associated radio access network paging areas is a subset of a core network tracking area identified by a paging area code value which is unique within the core network associated tracking area.

25 Claims, 4 Drawing Sheets

S1: Anchor gNB tx list of Tracking area ID (TAI) and RAN paging area code (RPAC) to the UE:
List corresponding to gNB's with Xn connectivity with anchor gNB S2: Configure UE with RAN notification area limited to only TAI and RPAC within the UE configured registration area

(51) Int. Cl.
H04W 64/00 (2009.01)
H04W 68/06 (2009.01)

(56) References Cited

U.S. PATENT DOCUMENTS

| | | | | |
|---|---|---|---|---|
| 2013/0143562 | A1 | 6/2013 | Singh et al. | |
| 2014/0038620 | A1* | 2/2014 | Hedberg | H04W 16/14 455/448 |
| 2016/0142970 | A1* | 5/2016 | Chen | H04W 28/08 370/328 |
| 2017/0311221 | A1* | 10/2017 | Pudney | H04W 36/0083 |
| 2019/0141659 | A1* | 5/2019 | Frenger | H04W 76/10 |

OTHER PUBLICATIONS

3GPP TSG-RAN WG2 Meeting NR Ad Hoc; R2-1700110; "Paging in RRC_INACTIVE"; Spokane, WA, USA; Jan. 17-19, 2017; 4 pages.
3GPP TSG-RAN WG2-AH; Tdoc R2-1700538; "RAN Based Tracking Area"; Spokane, WA, USA; Jan. 17-19, 2017; 2 pages.
3GPP TSG-RAN WG3 Meeting #96; R3-171932; "TP for TS 38.300"; Hangzhou, P. R. China; May 15-19, 2017; 8 pages.
3GPP TS 38300, V0.4.0; 3GPP; 3rd Generation Partnership Project; Technical Specification Group Radio Access Network; NR; NR and NG-RAN Overall Description; Stage 2 (Release 15); Sophia Antipolis, Valbonne, France; Jun. 2017; 55 pages.
European Search Report for Application No. 17913406.9, dated Jan. 20, 2021, 11 pages.
3GPP TSG-RAN WG2 Meeting #95; R2-165722; "Discussion on New RRC State in NR"; Agenda item: 9.4.3.1; Samsung Electronics Co., Ltd.; Gothenburg, Sweden; Aug. 22-26, 2016; 9 pages.
3GPP TSG-RAN WG2 Meeting #97bis; R2-1702511; "RAN Notification Area for NR"; Agenda item: 10.4.5.1; Samsung; Spokane, WA, USA; Apr. 3-7, 2017; 4 pages.

* cited by examiner

RAN AREA ID CONFIGURATION

CROSS-REFERENCE TO RELATED APPLICATIONS

This application is a national stage entry of International Application No. PCT/FI2017/050453, filed Jun. 16, 2017, entitled "RAN AREA ID CONFIGURATION" which is hereby incorporated by reference in its entirety.

FIELD

This disclosure relates to communications, and particularly to a radio area network area identifier configuration scheme for a wireless communication system. More particularly still this disclosure relates to a radio area network area identifier configuration scheme for a user equipment operating in a 5G network.

BACKGROUND

A communication system can be seen as a facility that enables communication between two or more devices such as user terminals, machine-like terminals, base stations and/or other nodes by providing communication channels for carrying information between the communicating devices. A communication system can be provided for example by means of a communication network and one or more compatible communication devices. The communication may comprise, for example, communication of data for carrying data for voice, electronic mail (email), text message, multimedia and/or content data communications and so on. Non-limiting examples of services provided include two-way or multi-way calls, data communication or multimedia services and access to a data network system, such as the Internet.

In a wireless system at least a part of communications occurs over wireless interfaces. Examples of wireless systems include public land mobile networks (PLMN), satellite based communication systems and different wireless local networks, for example wireless local area networks (WLAN). A local area wireless networking technology allowing devices to connect to a data network is known by the tradename WiFi (or Wi-Fi). WiFi is often used synonymously with WLAN. The wireless systems can be divided into cells, and are therefore often referred to as cellular systems. A base station provides at least one cell.

A user can access a communication system by means of an appropriate communication device or terminal capable of communicating with a base station. Hence nodes like base stations are often referred to as access points. A communication device of a user is often referred to as user equipment (UE). A communication device is provided with an appropriate signal receiving and transmitting apparatus for enabling communications, for example enabling communications with the base station and/or communications directly with other user devices. The communication device can communicate on appropriate channels, e.g. listen to a channel on which a station, for example a base station of a cell, transmits.

A communication system and associated devices typically operate in accordance with a given standard or specification which sets out what the various entities associated with the system are permitted to do and how that should be achieved. Communication protocols and/or parameters which shall be used for the connection are also typically defined. Non-limiting examples of standardised radio access technologies include GSM (Global System for Mobile), EDGE (Enhanced Data for GSM Evolution) Radio Access Networks (GERAN), Universal Terrestrial Radio Access Networks (UTRAN) and evolved UTRAN (E-UTRAN). An example communication system architecture is the long-term evolution (LTE) of the Universal Mobile Telecommunications System (UMTS) radio-access technology. The LTE is standardized by the 3rd Generation Partnership Project (3GPP). The LTE employs the Evolved Universal Terrestrial Radio Access Network (E-UTRAN) access and a further development thereof which is sometimes referred to as LTE Advanced (LTE-A). Since introduction of fourth generation (4G) services increasing interest has been paid to the next, or fifth generation (5G) standard. 5G is sometimes also referred to as New Radio Access Technology (N-RAT) or simply New Radio (NR). N-RAT aims to enable a diverse and wide range of services which need to deliver high throughput, connect numerous devices or terminals and provide immediate feedback on demand. The terms 5G, NR, 5G NR and N-RAT are used interchangeably herein.

STATEMENT OF INVENTION

According to a first aspect there is provided a method comprising configuring a user equipment in a low activity state to operate within a radio access network wherein a radio access network notification area for the user equipment is defined based on a list of logically associated radio access network paging areas, wherein each of the logically associated radio access network paging areas is a subset of a core network tracking area identified by a paging area code value which is unique within the core network associated tracking area.

A method may further comprise receiving configuration information comprising the list of logically associated radio access network paging areas from at least one access node.

According to a second aspect there is provided a method comprising broadcasting from each access node within a radio access network configuration information for defining a notification area, the information comprising: a tracking area identifier and paging area code value which is unique within the tracking area.

A method may further comprise generating the configuration information for defining a notification area based on assistance information from a core network node.

The paging area code value may be a limited size code.

The radio access network paging area identifier may be defined as the combination of the core network tracking area identifier and paging area code value.

The list of logically associated radio access network paging areas may comprise only the list of logically associated radio access network paging areas within a user equipment registration area.

The list of logically associated radio access network paging areas may be associated with a current serving access node.

The list of logically associated radio access network paging areas may be in connectivity with the current serving access node.

The low activity state may comprise an inactive or idle state.

The user equipment may be operating in a fifth generation or new radio network.

The access node may be in operation in a fifth generation or new radio network.

A computer program comprising program code means adapted to perform the steps disclosed herein when the program is run on a data processing apparatus.

According to a third aspect there is provided an apparatus comprising at least one processor, and at least one memory including computer program code, wherein the at least one memory and the computer program code are configured, with the at least one processor, to configure a user equipment in a low activity state to operate within a radio access network wherein a radio access network notification area for the user equipment is defined based on a list of logically associated radio access network paging areas, wherein each of the logically associated radio access network paging areas is a subset of a core network tracking area identified by a paging area code value which is unique within the core network associated tracking area.

The processor may be further caused to receive configuration information comprising the list of logically associated radio access network paging areas from at least one access node.

According to a fourth aspect there is provided an apparatus comprising at least one processor, and at least one memory including computer program code, wherein the at least one memory and the computer program code are configured, with the at least one processor, to broadcast from each access node within a radio access network configuration information for defining a notification area, the information comprising: a tracking area identifier and paging area code value which is unique within the tracking area.

The processor may be further caused to generate the configuration information for defining a notification area based on assistance information from a core network node.

The paging area code value may be a limited size code.

The radio access network paging area identifier may be defined as the combination of the core network tracking area identifier and paging area code value.

The list of logically associated radio access network paging areas may comprise only the list of logically associated radio access network paging areas within a user equipment registration area.

The list of logically associated radio access network paging areas may be associated with a current serving access node.

The list of logically associated radio access network paging areas may be in connectivity with the current serving access node.

The low activity state may comprise an inactive or idle state.

The apparatus may be a user equipment operating in a fifth generation or new radio network.

The apparatus may be an access node operating in a fifth generation or new radio network.

A system may comprise: at least one access node as discussed herein; and at least one user equipment as discussed herein.

BRIEF DESCRIPTION OF FIGURES

The invention will now be described in further detail, by way of example only, with reference to the following examples and accompanying drawings, in which.

DETAILED DESCRIPTION

In the following certain exemplifying embodiments are explained with reference to a wireless communication system serving communication devices adapted for wireless communication. Certain general principles of wireless systems are first briefly explained with reference to FIGS. 1 to 3.

A communication device 20, 21 can be used for accessing various services and/or applications provided via cells 4, 5, 6 of a cellular system. In a wireless communication system the access can be provided via wireless access interfaces between wireless communication devices and one or more base stations of a radio access network 1. Each mobile device and base station may have one or more radio channels open at the same time and may receive signals from more than one source.

Figure 1:
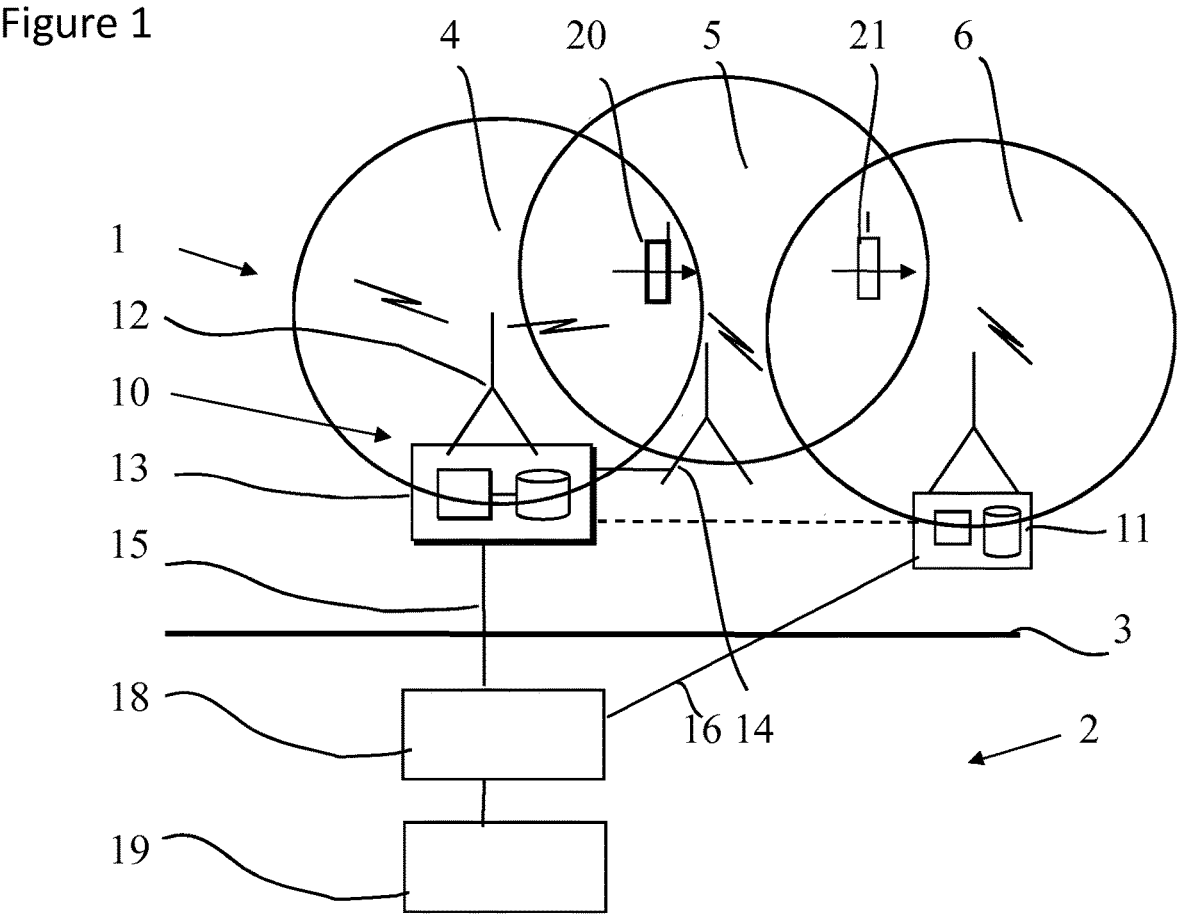
FIG. 1 shows a schematic example of a wireless communication system.

The mobile communication devices can move from a cell to another, as illustrated by arrows on top of the devices 20 and 21 in FIG. 1. The process of handling the moving from a cell to the other is called handover. Handovers can be provided, for example, in wireless environment comprising one or more fifth generation (5G) radio access networks (RAN). A part of handover procedure is known as cell reselection.

Figure 4:
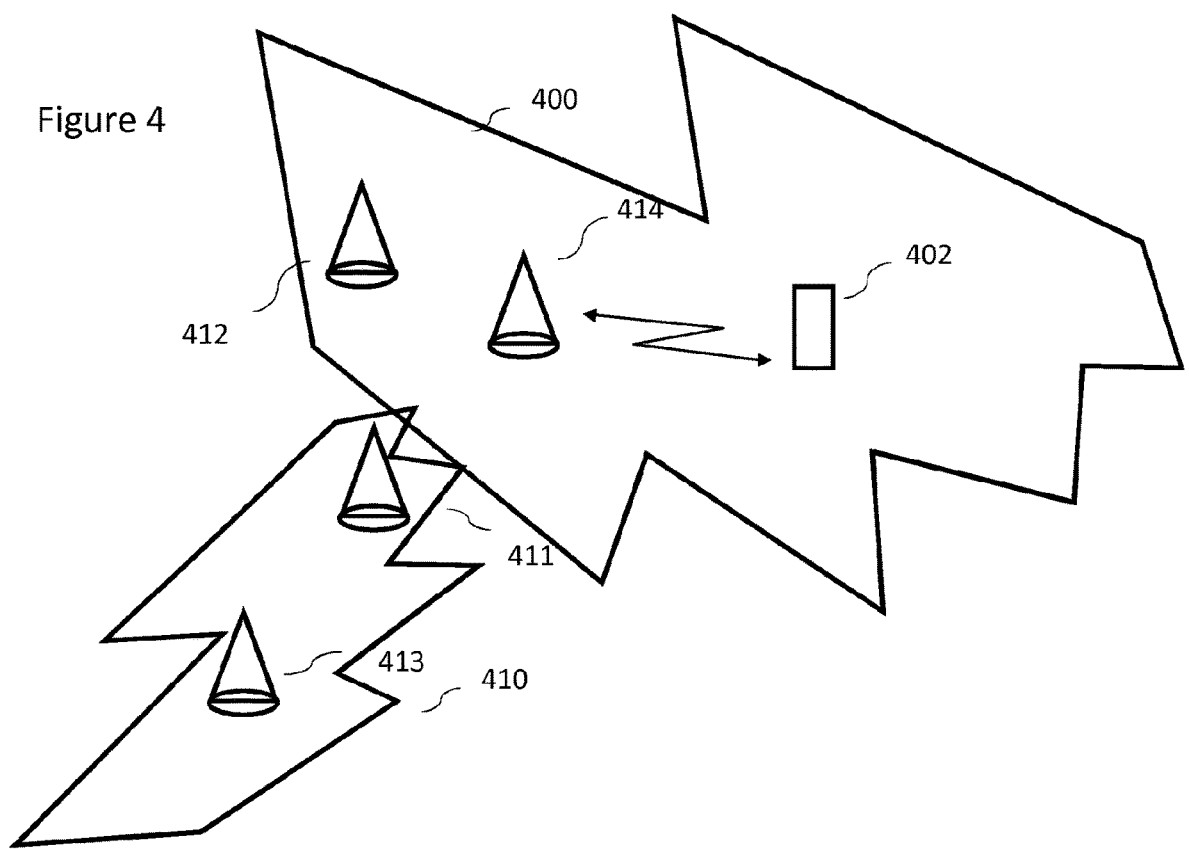
FIG. 4 schematically shows an example system implementing some embodiments.

A base station site can provide at least one cell. In the highly schematic FIG. 1 example, a base station site 10 comprising a controller 13 and base station apparatus 12 and 14 is shown to provide a plurality of cells 4 and 5, respectively. In the example of FIG. 4 cell 4 is provided by antenna apparatus of station 12 in one location, and at least one further cell is provided by a remote radio head 14. It is noted that this exemplifying arrangement is only shown for illustrative purposes, and that e.g. antenna apparatus 12 can provide more than one cell. The relevance in view of certain examples described below is that the controller 13 of the base station site 10 can control access and devices accessing the radio access network 1 in a number of cells.

In addition to the base station site 12, at least one other cell can also be provided by means of another base station or stations. This possibility is denoted by base station 11 in FIG. 1. Signalling between base stations, and controllers thereof, can be provided via an appropriate interface, for example an X2 interface or an evolution of X2 interface which may be referred to as X2* interface. The X2* interface may be used in 5G, and may comprise enhancements over the X2 interface. This is denoted by the dashed line between the control entities 13 and 11.

A wireless system is typically divided between a radio access system 1, typically called radio access network (RAN) and a core network (CN) 2. The division is denoted by line 3. The core network can comprise elements such as mobile management entity (MME) 18, home subscriber server (HSS) 19 and so forth. Connection between base station sites of the radio access network (RAN) and core network (CN) element can be provided via appropriate interfaces 15, 16. The connection between the RAN and the CN can be, for example, via a S1 interface or an evolution of the S1 interface which may be referred to as S1* interface. The S1* interface may be used in 5G, and may comprise enhancements over the S1 interface.

A communication device can access a communication system based on various access techniques, for example those based on the third Generation Partnership Project (3GPP) specifications. A non-limiting example of mobile architectures is known as the Evolved Universal Terrestrial Radio Access Network (E-UTRAN). The architecture may of course alternatively comprise a future equivalent to E-UTRAN, for example the architecture of the "Next Gen" or 5G network. A non-limiting example of a base station of a cellular system is what is termed as a NodeB or E-UTRAN NodeB (eNB/ENodeB) in the vocabulary of the 3GPP specifications. The eNBs may provide E-UTRAN features such as user plane Radio Link Control/Medium Access Control/Physical Layer Protocol (RLC/MAC/PHY) and control plane Radio Resource Control (RRC) protocol terminations towards mobile communication devices. At least some of the stations may be arranged to operate on the unlicensed radio spectrum. In the parlance of 5G these base stations may be referred to as gNBs or next generation Node Bs.

Figure 2:
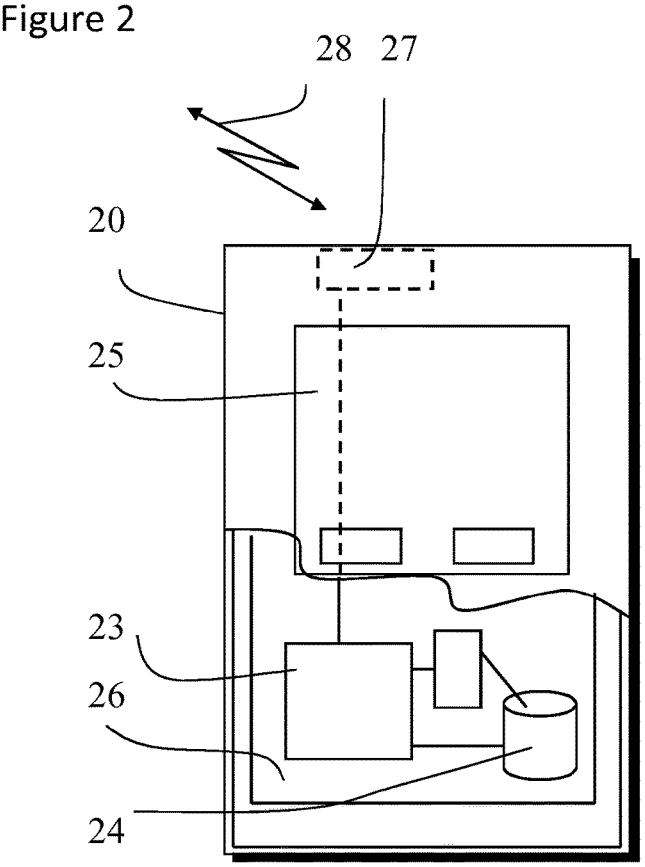
FIG. 2 shows an example of a communication device.

FIG. 2 shows a schematic, partially sectioned view of a communication device 20 that a user can use for communications. Such a communication device is often referred to as user equipment (UE) or terminal. An appropriate communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia, positioning data, other data, and so on. Users may thus be offered and provided numerous services via their communication devices. Non-limiting examples of these services include two-way or multi-way calls, data communication or multimedia services or simply an access to a data communications network system, such as the Internet.

A mobile device is typically provided with at least one data processing entity 23, at least one memory 24 and other possible components 29 for use in software and hardware aided execution of tasks it is designed to perform, including control of access to and communications with base stations and/or other user terminals. The tasks can include operation related to mobility management such as handling handovers and cell reselections. Further, the tasks can also relate to security aspects of the communications. The data processing, storage and other relevant control apparatus can be provided on an appropriate circuit board and/or in chipsets. This apparatus is denoted by reference 26.

A user may control the operation of the device 20 by means of a suitable user interface such as key pad, voice commands, touch sensitive screen or pad, combinations thereof or the like. A display 25, a speaker and a microphone are also typically provided. Furthermore, a mobile communication device may comprise appropriate connectors (either wired or wireless) to other devices and/or for connecting external accessories, for example hands-free equipment, thereto.

The device 20 may receive and transmit signals 28 via appropriate apparatus for receiving and transmitting signals. In FIG. 2 transceiver apparatus is designated schematically by block 27. The transceiver may be provided for example by means of a radio part and associated antenna arrangement. The antenna arrangement may be arranged internally or externally to the mobile device. A wireless communication device can be provided with a Multiple Input/Multiple Output (MIMO) antenna system.

Figure 3:
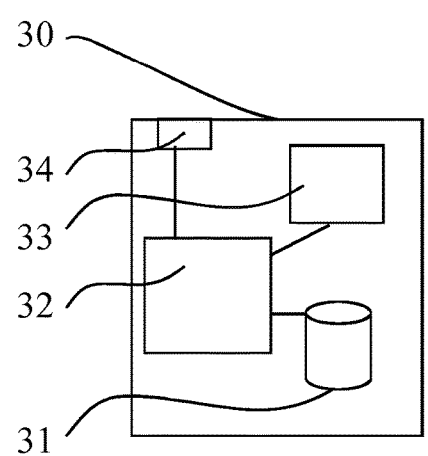
FIG. 3 shows an example of control apparatus.

FIG. 3 shows an example of a control apparatus 30 for a station, for example to be coupled to and/or for controlling one of the stations 11, 12 and 14 of FIG. 1. The control apparatus 30 can be arranged to provide control on configurations used by the communications devices accessing the station, information processing and/or communication operations. A control apparatus can be configured to provide control functions in association with generation, communications, and interpretation of control information. The control apparatus 30 comprises at least one memory 31, at least one data processing unit 32, 33 and an input/output interface 34. Via the interface the control apparatus can be coupled to the relevant node. The control apparatus 30 can be configured to execute an appropriate software code to provide the control functions.

With the trends towards the Internet of Things (IoT) and massive machine type communications (mMTC) it is expected that in 5G there will be even more battery powered UEs (e.g. sensors, baggage tags, etc.). Therefore, battery efficiency and lifetime will be important, especially for those devices for which accessibility is limited. Also there is the requirement for fast first packet transmission (either downlink or uplink) in 5G which is likely to be faster than the previous mobile generations. There is typically a trade-off between device power efficiency and fast accessibility which is referred as the "UE sleeping problem". 5G proposals has defined a radio resource control (RRC) state called "Connected Inactive" in addition to "Connected" and "Idle". The connected inactive state is one where previously exchanged information is not discarded for inactive UEs. In other words that UEs in RRC "Connected Inactive" state keep parts of the radio access network (RAN) context. This is valid at least for the semi-static information such as security context, UE capability information, etc. In addition to storing the RAN context, signalling is reduced by allowing the UE to move around within a pre-configured area without notifying the network. The state is also envisioned to be highly configurable with a wide range of discontinuous reception (DRX) cycles (from milliseconds to hours) and service-tailored optimizations regarding the method to perform the transition to RRC "Connected" state.

In this state model, state transitions from "Idle" to "Connected" are expected to occur mainly during the first initial access (e.g. when the UE attaches to the network) or as a fallback case (e.g. when the devices and/or network cannot use the previously stored RAN context). Consequently, this transition is not expected to occur as often as in LTE-A. On the other hand, transitions from "Connected Inactive" to "Connected" are expected to occur often and should be optimized as a lightweight and fast transition.

This may be achieved by keeping the core network (CN)/radio access network (RAN) connection alive during inactivity periods and reducing the amount of RRC signalling required to resume an existing inactive connection via the reporting of a RAN context ID that can be fetched at the network side.

The "connected inactive" RRC state may thus be considered a low power state of a UE where a UE and at least one gNB (master base station in N-RAT terminology) should keep the access system (AS) context information. A UE location can be known at the RAN based area level where that area may be a single cell or more than one cell.

An example of the context information is the UE location which is known at the "RAN based area level" and that the RAN should be aware whenever the UE moves from one "RAN-based notification area" to another. This for example is defined in the current proposals as A UE in the RRC_INACTIVE state can be configured with the RAN-based notification area. The RAN based notification area determines the granularity at which the RAN knows the UE location during RRC_INACTIVE state, whereupon a notification area can cover a single or multiple cells, and can be smaller than the CN area. Also a UE does not send any "location update" indication providing it stays within the boundaries of the notification area but when leaving the area, a UE updates its location to the network.

It has been proposed that there are two possible options to define RAN-based notification areas. A first proposal is the list of cells proposal where a UE is provided an explicit list of cells (one or more) that constitute the RAN-based notification area. The list of cells makes sense when the UE is quasi-stationary. In this approach, the gNB can configure the UE with a list of cells which is very UE specific. When the network knows that the UE is quasi-stationary this option allows to reduce the signalling overhead by strictly focusing the paging on the zone where the UE is located.

A second proposal is the RAN area (i.e. RAN Paging Area) proposal wherein a UE is provided (at least one) RAN area ID, for example a cell broadcasts (at least one) RAN area ID in the system information so that a UE knows which area the cell belongs to. For moving UEs the list of NG-Cell IDs may not be the most appropriate configuration. It is indeed cumbersome to configure hundreds of cells to the UE. This creates signalling overhead and scalability issue and as such it is beneficial to configure the UE with a larger RAN Notification Area while not increasing the signalling by configuring RAN Paging Areas in the network, each RAN paging area comprising itself possibly tens of cells. The UE is then configured whenever sent to INACTIVE_STATE with a list of Paging Area IDs (PA IDs) instead of list of NG-Cell IDs and this list of PA IDs constitutes its RAN-based Notification Area. In such a system all that is needed is a new broadcast by all cells in the network of the Paging Area ID to which any cell belongs. This list of RAN Paging area IDs can help address scalability issues. For example, an simple example deployment is to use the RAN Paging area ID=gNB ID. Each cell broadcasts the gNB ID they belong to. When the UE is sent to RRC_Inactive the serving gNB therefore sends to the UE a list of gNB IDs as its RAN Notification Area. The serving gNB can easily provide in this list the neighbour gNBs with which it has Xn connectivity. Xn connectivity is thus ensured within the RAN Notification Area.

As explained above the Cell ID list is not an efficient solution to create a large RAN notification area with lots of involved cells as it exposes extensive signalling overhead to configure each UE dedicatedly. However, it is a dynamic solution and is likely to be adopted as one option.

However the CN level tracking area (TA) list is likely to have problems due to the Xn-interface (gNB to gNB interface) connectivity. This Xn-interface connectivity is such that the list of gNB ID's may be incomplete across the TA (even across single TA). The full list cannot be ensured which means the RAN paging cannot be realized using the Xn-connectivity method proposed. Furthermore even if the RAN Notification Area (RNA) is a subset of the list of tracking area identifiers (TAIs) comprising the UE's registration area, Xn connectivity cannot be guaranteed across this subset. This means that the probability of RAN paging failing would be high, with associated very long paging delays.

Hence, the current idea is one wherein the RAN area ID list is adopted on top of the Cell ID list. However the main issue with the RAN area ID is the additional signalling overhead as it needs to be broadcasted over the air (system information) additionally to TAC (Tracking Area Code—CN level) and Cell ID in the cell.

The concept thus as described in further detail hereafter is one in which to minimize the overhead required by signalling the RAN area ID in the system information broadcast a single RAN Paging Area Code (RPAC) is determined to be valid only within one TAC.

Thus in embodiments implementing such concepts a UE can be configured with a RAN Notification Area consisting of a list of tracking area identifiers (TAIs) and for each tracking area identifier (TAI) an associated list of relevant RAN paging area codes (RPACs).

In some embodiments the tracking area code (TAC) association in the RAN area configuration may be optional. In such embodiments the RAN area ID may be signalled to the UE without any TAC information. In such embodiments the UE may be configured to determine that the UE is to be associated to the TAC of the current serving cell.

Some embodiments will now be described which allow a 5G UE to remain reachable whilst in a low activity or idle state, and which allow the UE to perform UL transmissions.

FIG. 4 for example shows a first tracking area 400 within which are logically assigned gNBs 412 and 414 and a second tracking area 410 within which are logically assigned gNBs 411 and 413. Although the example shown herein shows tracking areas which comprise 2 gNBs it is understood that in some embodiment the number of gNBs per tracking area are more than 2 gNBs per tracking area. Each of the gNBs within a tracking area have assigned a tracking area identifier (TAI). In some embodiments in order to be able to signal the tracking area identifier one of the gNBs, which in this example is 414 is the anchor gNB and is configured to communicate with the UE 402.

In this typical example the tracking areas 400, 410 and thus the tracking area identifiers (which identifies the gNBs within each tracking area) are configured such that each tracking area does not comprise more than 256 gNB.

In some embodiments each cell of a gNB is configured to broadcast the same RAN Paging Area Code (RPAC).

Thus when configuring the RAN notification area (RNA) at the UE, the anchor gNB 414 is configured to send the list comprising of the values of the tracking area identifier and furthermore the RAN paging area code (TAI+RPAC) to the UE.

Each TAI+RPAC combination therefore corresponds to a gNB.

In some embodiments the anchor gNB 414 is configured to include within the list only the values of the tracking area identifier and the RAN paging area code (TAI+RPAC) corresponding to gNBs with which it has Xn connectivity.

In some embodiments the RAN may get the information of the used TAI list for UE CN registration area from the CN as assistance information.

The RNA configuration for the UE in some embodiments may be limited to comprise only the values of the tracking area identifier and the RAN paging area code (TAI+RPAC) within the UE's configured registration area.

Figure 5:
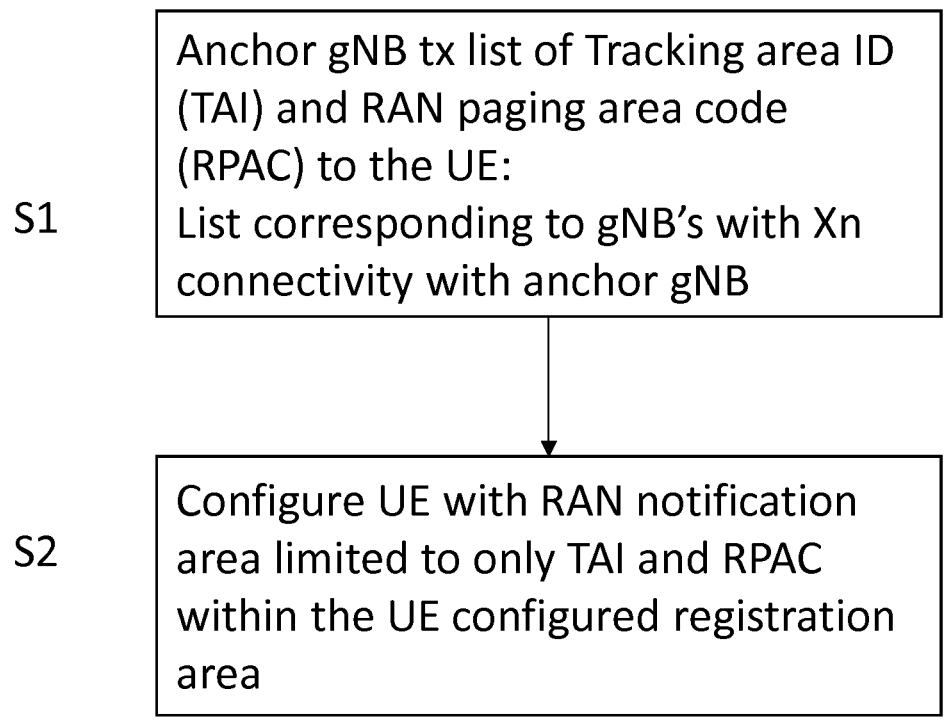
FIG. 5 shows a flowchart of a method according to an embodiment.

FIG. 5 is a flow chart showing method steps according to an embodiment of the present invention.

At step S1 a Anchor gNB transmits or signals a list of Tracking area ID (TAI) and RAN paging area code (RPAC) values to the UE. The list corresponds to gNBs with Xn connectivity with anchor gNB.

At step S2, and in response to the list the UE is configured with a RAN notification area limited to only TAI and RPAC within the UE configured registration area.

Appropriate means can be provided for implementing the above described functions. The means can be software and/or hardware based, and are not limited by the examples given in this specification.

It is appreciated that by employing the embodiments shown herein as the tracking area code (TAC) can be used to determine the RAN area ID association the RAN area ID space to be specified can be smaller and thus overhead saved from the costly broadcast signalling.

Thus when compared to implementations where the RAN Notification Area (RNA) is defined by the list of cells the signalling overhead to configure the RNA is limited because the gNB sends to the UE a list of RAN Area IDs. In other words the gNB sends a list of (TAI+RPAC) values.

This may be further compared to the solution where RAN Notification Area id defined by a list of TAIs. The addition of RPAC values as discussed above allows the RNA to be limited, for a given TAI, to a smaller area which has Xn connectivity with the anchor gNB and therefore avoids the paging failure and delays.

Furthermore in some embodiments the RPAC values (where there are less than 256 gNBs per tracking area) may be defined as a one-byte field which is broadcast over the air in addition to cell ID and TAC.

The solution described herein is therefore a good trade-off which addresses the need of large RNA while limiting the impact to the radio broadcast to one byte only.

The required data processing apparatus and functions may be provided by means of one or more data processors. The described functions may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

An appropriately adapted computer program code product or products may be used for implementing the embodiments, when loaded or otherwise provided on an appropriate data processing apparatus, for example for causing use of specific security credential and/or updates thereof, control operation of the devices and communication of information between the various devices. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It is noted that whilst certain embodiments have been described above in relation to certain architectures, this disclosure is not limited by this. Therefore, although certain embodiments were described above by way of example with reference to certain exemplifying architectures for wireless networks, technologies and standards, embodiments may be applied to any other suitable forms of communication systems than those illustrated and described herein. It is also noted that different combinations of different embodiments are possible. It is also noted herein that while the above describes exemplifying embodiments of the invention, there are several variations and modifications which may be made to the disclosed solution without departing from the spirit and scope of the present invention.

The invention claimed is:

1. A method comprising:
in response to a user equipment entering a low activity state within a radio access network, sending a tracking area identifier and a list of radio access network paging area code values to the user equipment, wherein a radio access network notification area for the user equipment identified by the tracking area identifier is defined based on a list of logically associated radio access network paging areas, wherein each of the logically associated radio access network paging areas is a subset of a core network tracking area and is identified by one of the radio access network paging area code values, each of the radio access network paging area code values being unique within the core network tracking area.

2. A method as claimed in claim 1, further comprising:
receiving configuration information comprising the list of logically associated radio access network paging areas from at least one access node.

3. A method comprising:
broadcasting, from each access node within a radio access network in response to a user equipment entering a low activity state, configuration information for defining a notification area, the configuration information comprising a tracking area identifier and a paging area code value, the paging area code value being unique within the tracking area.

4. A method according to claim 3, further comprising:
generating the configuration information for defining a notification area based on assistance information from a core network node.

5. A method as claimed in claim 1, wherein the paging area code value is a limited size code.

6. A method as claimed in claim 1, wherein the radio access network paging area is identified by a combination of an identifier of the core network tracking area and a paging area code value.

7. A method according to claim 1, wherein the list of logically associated radio access network paging areas comprise only the list of logically associated radio access network paging areas within a user equipment registration area.

8. A method according to claim 1, wherein the list of logically associated radio access network paging areas are associated with a current serving access node.

9. A method according to claim 8, wherein the list of logically associated radio access network paging areas are in connectivity with the current serving access node.

10. A method according to claim 1, wherein the low activity state comprises an inactive or idle state.

11. A method according to claim 1, wherein the user equipment is operating in a fifth generation or new radio network.

12. A method according to claim 1, wherein the method is performed by an access node operating in a fifth generation or new radio network.

13. An apparatus comprising a non-transitory computer-readable storage medium comprising instructions stored thereon that, when executed by at least one processor, are configured to cause a computing system to perform the method of claim 1.

14. An apparatus comprising:
at least one processor, and at least one memory including computer program code, wherein the at least one memory and the computer program code are configured, with the at least one processor, to, in response to a user equipment entering a low activity state to operate within a radio access network, send a tracking area identifier and a list of radio access network paging area code values to the user equipment, wherein a radio access network notification area for the user equipment identified by the tracking area identifier is defined based on a list of logically associated radio access network paging areas, wherein each of the logically associated radio access network paging areas is a subset of a core network tracking area and is identified by one of the radio access network paging area code values, each of the radio access network paging area code values being unique within the core network associated tracking area.

15. An apparatus as claimed in claim 14, wherein the at least one memory and the computer program code are configured, with the at least one processor, to further cause the user equipment to receive configuration information comprising the list of logically associated radio access network paging areas from at least one access node.

16. An apparatus comprising:
at least one processor, and at least one memory including computer program code, wherein the at least one memory and the computer program code are configured, with the at least one processor, to cause the apparatus to broadcast from each access node within a radio access network in response to a user equipment entering a low activity state, configuration information for defining a notification area, the configuration information comprising: a tracking area identifier and a paging area code value, the paging area code value being unique within the tracking area.

17. An apparatus according to claim 16, wherein the at least one memory and the computer program code are configured, with the at least one processor, to further cause the apparatus to generate the configuration information for defining a notification area based on assistance information from a core network node.

18. An apparatus according to claim 14, wherein the paging area code value is a limited size code.

19. An apparatus as claimed in claim 14, wherein the radio access network paging area is identified by a combination of an identifier of the core network tracking area and a paging area code value.

20. An apparatus as claimed in claim 14, wherein the list of logically associated radio access network paging areas comprise only the list of logically associated radio access network paging areas within a user equipment registration area.

21. An apparatus according to claim 14, wherein the list of logically associated radio access network paging areas are associated with a current serving access node.

22. An apparatus according to claim 21, wherein the list of logically associated radio access network paging areas are in connectivity with the current serving access node.

23. An apparatus according to claim 14, wherein the low activity state comprises an inactive or idle state.

24. An apparatus according to claim 14, wherein the user equipment is operating in a fifth generation or new radio network.

25. An apparatus according to claim 14, wherein the apparatus is configured to operate in a fifth generation or new radio network.

* * * * *